United States Patent
Fletcher et al.

(10) Patent No.: US 11,238,143 B2
(45) Date of Patent: Feb. 1, 2022

(54) METHOD AND SYSTEM FOR AUTHENTICATING A USER ON A WEARABLE HEADS-UP DISPLAY

(71) Applicant: GOOGLE LLC, Mountain View, CA (US)

(72) Inventors: Bergen Fletcher, St. Jacobs (CA); Idris S. Aleem, Kitchener (CA)

(73) Assignee: Google LLC, Mountain View, CA (US)

(*) Notice: Subject to any disclaimer, the term of this patent is extended or adjusted under 35 U.S.C. 154(b) by 70 days.

(21) Appl. No.: 16/412,520

(22) Filed: May 15, 2019

(65) Prior Publication Data

US 2019/0370450 A1 Dec. 5, 2019

Related U.S. Application Data

(60) Provisional application No. 62/680,969, filed on Jun. 5, 2018.

(51) Int. Cl.
*G06F 21/32* (2013.01)
*G02B 27/01* (2006.01)
*G06K 9/00* (2006.01)

(52) U.S. Cl.
CPC ........... *G06F 21/32* (2013.01); *G02B 27/017* (2013.01); *G06K 9/00604* (2013.01); *G06K 9/00617* (2013.01)

(58) Field of Classification Search
CPC ................. G06F 21/32; G02B 27/017; G02B 27/0093; G06K 9/00604; G06K 9/00617; G06K 9/6215
See application file for complete search history.

(56) References Cited

U.S. PATENT DOCUMENTS

| | | | | |
|---|---|---|---|---|
| 5,291,560 | A * | 3/1994 | Daugman | G06K 9/00906 382/117 |
| 8,971,570 | B1 * | 3/2015 | Raffle | G06F 3/013 382/103 |
| 2010/0149073 | A1 * | 6/2010 | Chaum | G02B 27/0172 345/8 |
| 2011/0102874 | A1 * | 5/2011 | Sugiyama | G02B 26/106 359/205.1 |
| 2014/0337634 | A1 * | 11/2014 | Starner | G06F 3/013 713/186 |
| 2016/0057339 | A1 * | 2/2016 | Raffle | G06F 3/017 348/222.1 |
| 2016/0238845 | A1 * | 8/2016 | Alexander | G06F 3/011 |
| 2017/0208576 | A1 * | 7/2017 | Chendamarai Kannan | H04W 72/0406 |
| 2017/0229095 | A1 * | 8/2017 | Raffle | G06F 3/013 |
| 2017/0235931 | A1 * | 8/2017 | Publicover | H04N 5/44504 |
| 2017/0286659 | A1 * | 10/2017 | Xiao | G06K 9/00604 |
| 2018/0149863 | A1 * | 5/2018 | Aleem | G06F 3/013 |
| 2018/0365490 | A1 * | 12/2018 | Agrawal | G06K 9/0061 |

* cited by examiner

*Primary Examiner* — Nay A Maung
*Assistant Examiner* — Jose M Torres

(57) ABSTRACT

A method of operating a wearable heads-up display that in use is worn on a head of a user includes generating an infrared light, scanning the infrared light over an eye of the user, detecting reflections of infrared light from the eye of the user, and extracting test biometric identification data from at least a portion of the detected reflections and corresponding scan orientations. A similarity measure between the test biometric identification data and reference biometric identification data associated with the wearable heads-up display is determined. The user is authenticated based on the similarity measure.

27 Claims, 10 Drawing Sheets

METHOD AND SYSTEM FOR AUTHENTICATING A USER ON A WEARABLE HEADS-UP DISPLAY

CROSS-REFERENCE TO RELATED APPLICATIONS

This application claims the benefit of U.S. Provisional Application No. 62/680969, filed 5 Jun. 2018, the content of which is incorporated herein in its entirety by reference.

TECHNICAL FIELD

The disclosure generally relates to authentication methods and systems and particularly to user authentication on wearable electronic devices.

BACKGROUND

There is a new generation of wearable heads-up displays that can be worn on the head like conventional eyeglasses. These wearable heads-up displays are electronic devices that, when worn on the head of users, enable the users to see display content without preventing the users from seeing the environment. Wearable heads-up displays offer private viewing of information in that the display has to be worn on the head to see display content. Enabling user authentication on the wearable heads-up display will allow the device to be both private and secure.

User authentication is the verification of the identity of a user by transfer of credentials between the user and machine. Validating the identity of the user establishes a trust relationship for further interactions between the user and machine. There are various types of authentication methods, e.g., password authentication, certificate-based authentication, smart card authentication, token-based authentication, and biometric authentication. Out of these different authentication methods, only biometric authentication relies on biological characteristics of the user. Biometric authentication may have advantages over other authentication methods in that biological characteristics cannot be easily stolen from the user. Biometric authentication also does not require that the user remembers passwords or security certificate locations or carry around dedicated devices with authentication credentials. On the other hand, biometric authentication typically requires a system to capture biometric samples from the user at the time of authentication.

One of the biological characteristics of a user that may be relied upon for biometric authentication is the iris. The iris is a flat, pigmented, near-circular membrane behind the cornea of the eye and has an adjustable near-circular opening in its center, known as pupil. The inner boundary of the iris may be referred to as pupillary iris boundary, and the outer boundary of the iris may be referred to as limbic iris boundary. Adjustment of the pupil size is controlled by two muscles in the iris: the sphincter muscle and the dilator muscle. The sphincter muscle encircles the pupil, and the dilator muscle runs radially in the iris. The sphincter muscle and dilator muscle work together to control the pupil size. In bright light, the sphincter muscle contracts and the dilator muscle relaxes, decreasing the pupil size to allow less light to enter the eye. In dim light, the sphincter muscle relaxes and the dilator muscle contracts, increasing the pupil size to allow more light to enter the eye. The sphincter and dilator muscles give the iris a texture. Iris recognition systems are based on the notion that each iris has an iris texture that is unique and more or less stable over time.

SUMMARY

A method of operating a wearable heads-up display that in use is worn on a head of a subject user, the wearable heads-up display having associated therewith reference biometric identification data of at least one registered user, may be summarized as including (a.1) generating an infrared light; (a.2) scanning the infrared light over at least a portion of at least one eye of the subject user through a plurality of scan orientations; (a.3) detecting reflections of infrared light from the eye of the subject user during the scanning of the at least one eye; (a.4) extracting test biometric identification data from at least a portion of the detected reflections and corresponding scan orientations; (a.5) determining a similarity measure between the test biometric identification data and the reference biometric identification data; and (a.6) authenticating the subject user based on the similarity measure.

The method may include receiving a request to unlock the wearable heads-up display, wherein act (a.4) of the method is in response to the request. The method may include detecting a proximity of the wearable heads-up display to a head of the subject user and triggering the request to unlock the wearable heads-up display in response to the proximity of the wearable heads-up display to the head of the subject user exceeding a proximity threshold. Alternatively, act (a.6) of the method may include determining whether a value of the similarity measure exceeds a similarity threshold or a probability threshold. Act (a.6) of the method may further include unlocking the wearable heads-up display in response to a determination that the value of the similarity measure exceeds the similarity threshold or probability threshold.

The method may include, upon successful authentication of the subject user, transmitting a set of authentication credentials including at least a portion of the reference biometric identification data or the test biometric identification data to a secondary interactive system for a confirmatory authentication of the subject user on the secondary interactive system. The method may include establishing a secure communication channel between the wearable heads-up display and the secondary interactive system, wherein the set of authentication credentials are transmitted to the secondary interactive system over the secure communication channel.

Act (a.4) of the method may include constructing at least one image or representative structure of at least a part of the at least one eye from the detected reflections and corresponding scan orientations and isolating an iris region of the at least one image or representative structure to obtain a test iris image for the subject user. Act (a.5) of the method may include determining the similarity measure between the test iris image and a reference iris image included in the reference identification data.

Act (a.4) of the method may include constructing at least one image or representative structure of at least a part of the at least one eye from the detected reflections and corresponding scan orientations, isolating an iris region of the at least one image or representative structure to obtain a test iris image for the subject user, and generating a test iris template from the test iris image. Act (a.5) of the method may include determining the similarity measure between the test iris template and a reference iris template included in the reference biometric identification data.

The method may include extracting a test auxiliary eye feature from the at least one image or representative structure of at least a part of the at least one eye. The test auxiliary eye feature may include at least one of eyelash pattern, eyelid shape, and iris occlusion pattern. Act (a.5) of the method may include determining the similarity measure between the test auxiliary eye feature and a reference auxiliary eye feature included in the reference biometric identification data.

Act (a.5) of the method may include receiving at least a portion of the reference biometric identification data from a non-transitory processor-readable storage medium associated with the wearable heads-up display.

Act (a.5) of the method may include transmitting the test biometric identification data to an iris recognition system external to the wearable heads-up display. Act (a.5) of the method may further include transmitting at least a portion of the reference biometric identification data to the iris recognition system.

Act (a.2) of the method may include scanning the infrared light over at least a portion of each of the eyes of the subject user through a plurality of scan orientations. Act (a.3) of the method may include detecting reflections of infrared light from each of the eyes of the subject user during the scanning of each eye. Act (a.4) of the method may include constructing at least one image or representative structure of at least a part of each eye of the subject user from the detected reflections and corresponding scan orientations and isolating an iris region of each of the at least one image or representative structure to obtain a set of test iris images for the subject user.

Act (a.4) of the method may further include generating a set of test iris templates from the set of test iris images. Act (a.5) of the method may include determining the similarity measure between the set of test iris templates and a set of reference iris templates included in the reference biometric identification data. Alternatively, act (a.5) of the method may include combining the set of test iris templates to obtain a binocular test iris template and determining a similarity measure between the binocular test iris template and a binocular reference iris template included in the reference biometric identification data.

A method of configuring a wearable heads-up display for authentication of a subject user may be summarized as including (b.1) generating an infrared light; (b.2) scanning the infrared light over at least a portion of at least one eye of the subject user through a plurality of scan orientations; (b.3) detecting reflections of infrared light from the at least one eye of the subject user during the scanning of the at least one eye; (b.4) extracting biometric identification data from at least a portion of the detected reflections and corresponding scan orientations; and (b.5) storing at least a portion of the extracted biometric identification data in a non-transitory processor-readable memory (or medium) associated with the wearable heads-up display.

Act (b.4) of the method may include constructing at least one image or representative structure of at least a part of the at least one eye from the detected reflections and corresponding scan orientations and isolating an iris region of the at least one image or representative structure. Act (b.4) of the method may further include creating an iris template from the isolated iris region. Act (b.5) of the method may include storing the iris template in the non-transitory processor-readable memory associated with the wearable heads-up display.

Act (b.2) of the method may include scanning the infrared light over at least a portion of each of the eyes of the subject user through a plurality of scan orientations. Act (b.3) of the method may include detecting reflections of infrared light from each of the eyes of the subject user during scanning of each eye. Act (b.4) of the method may include constructing at least one image or representative structure of at least a part of each eye of the subject user from the detected reflections and corresponding scan orientations and isolating an iris region of each of the at least one image or representative structure.

Act (b.4) of the method may further include creating an iris template from each of the isolated iris regions to obtain a set of iris templates. Act (b.5) of the method may include storing the set of iris templates in the non-transitory processor-readable memory associated with the wearable heads-up display.

The method may include (b.6) generating a visible light and scanning the visible light over at least a portion of the eye of the user. Act (b.2) may be simultaneous with scanning the visible light over at least a portion of the eye of the user. Act (b.6) may include varying an intensity of the visible light over a period of time to alter a size of a pupil of the eye.

Act (b.1) may include varying an intensity of the infrared light over a period of time to alter a size of a pupil of the eye.

A wearable heads-up display having a field of view includes a support frame that in use is worn on a head of a subject user, a laser module carried by the support frame, the laser module to generate an infrared light, an optical scanner carried by the support frame, the optical scanner positioned and oriented to scan the infrared light over at least a portion of an eye of the subject through a plurality of scan orientations, an infrared detector carried by the support frame, the infrared detector positioned and oriented to detect reflections of infrared light from the at least a portion of the eye of the subject user for the plurality of scan orientations, a processor carried by the support frame, and a non-transitory processor-readable storage medium communicatively coupled to the processor. The non-transitory processor-readable storage unit stores reference biometric identification data associated with at least one registered user. The non-transitory processor storage unit and data and/or processor executable instructions that, when executed by the processor, causes the wearable heads-up display to: extract, by the processor, test biometric identification data from at least a portion of reflections detected by infrared detector and corresponding scan orientations of the optical scanner, determine a similarity measure between the test biometric identification data and the reference biometric identification data by the processor, and authenticate the user based on the similarity measure by the processor.

The wearable heads-up display may include a proximity sensor carried by the support frame. The proximity sensor may be positioned and oriented to detect a proximity of the support frame to a head of the subject user.

The wearable heads-up display may include a transparent combiner carried by the support frame. The transparent combiner is positioned within the field of view of the wearable heads-up display to receive infrared light from the optical scanner and redirect the infrared light towards the eye of the user when the support frame is worn on the head of the user. The transparent combiner includes an infrared hologram or a hot mirror that is responsive to infrared light and unresponsive to visible light.

The laser module may have characteristics to generate visible light, and the optical scanner may be positioned and oriented to scan the visible light over the at least a portion of the eye of the user. The wearable heads-up display may include a combiner lens carried by the support frame. The combiner lens includes a transparent combiner positioned within the field of view of the wearable heads-up display. The transparent combiner is aligned to receive both infrared light and visible light from the optical scanner and to redirect both the infrared light and visible light towards the eye of the user when the support frame is worn on the head of the user.

A method of operating a wearable heads-up display that in use is worn on a head of a subject user, the wearable heads-up display having associated therewith reference biometric identification data of at least one registered user, may be summarized as including: acquiring at least one image or representative structure of at least a portion of at least one eye of the subject user; extracting test biometric identification data from the at least one image or representative structure; determining a similarity measure between the test biometric identification data and the reference biometric identification data; and authenticating the subject user based on the similarity measure.

The wearable heads-up display may include an additional laser module and optical scanner to generate infrared light and scan the infrared light over the other eye of the user when the support frame is worn on the head of the user. The wearable heads-up display may include an additional transparent combiner to receive the infrared light from the additional optical scanner and redirect the infrared light towards the other eye of the user when the support frame is worn on the head of the user.

The foregoing general description and the following detailed description are exemplary of the invention and are intended to provide an overview or framework for understanding the nature of the invention as it is claimed. The accompanying drawings are included to provide further understanding of various implementations and embodiments of the invention and are incorporated in and constitute part of this specification. The drawings illustrate various implementations and embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1A:
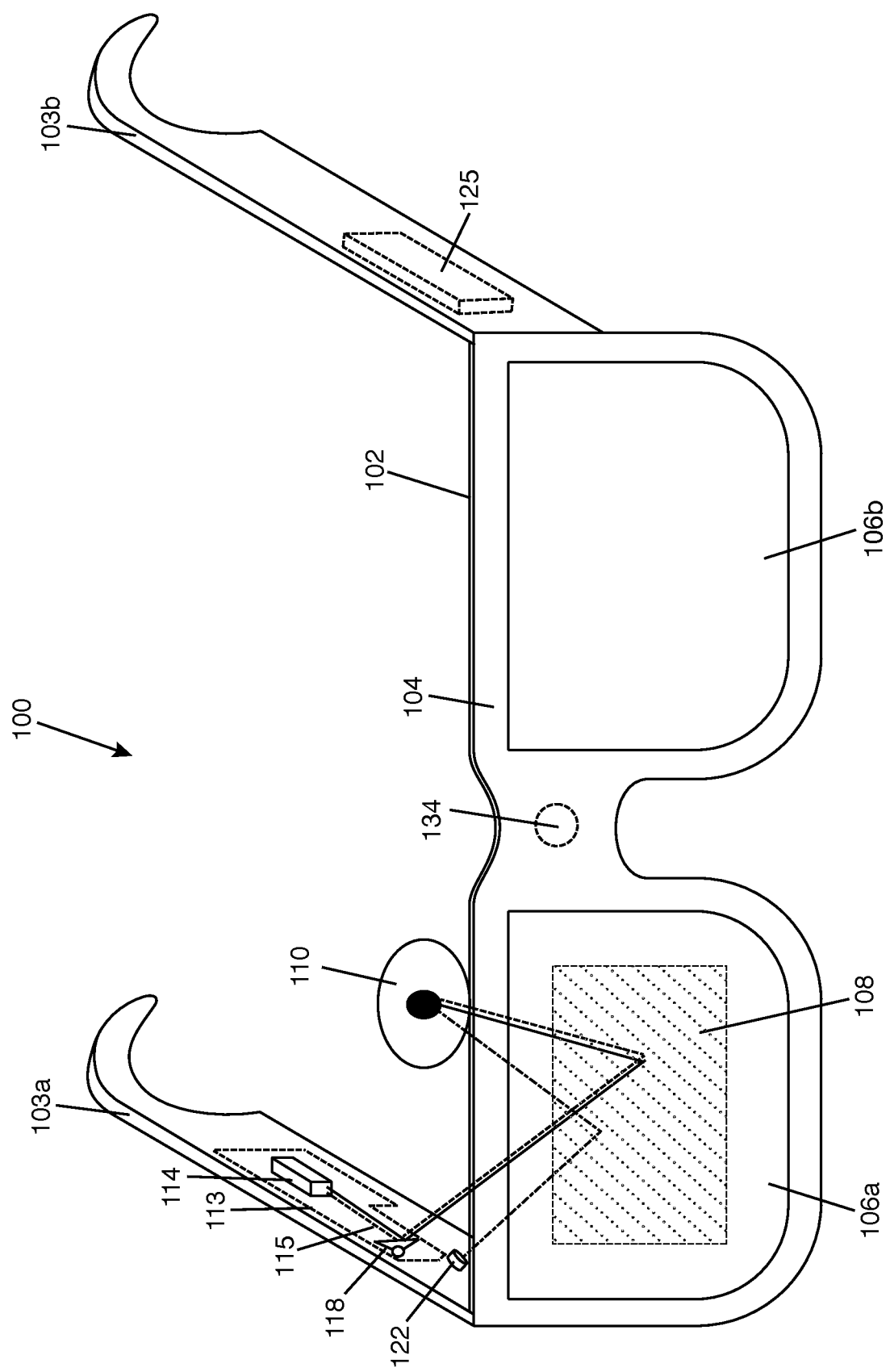
FIG. 1A is a perspective view of a wearable heads-up display and illustrates scanning of one eye of a user.

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations and the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the implementations or the embodiments.

In at least one implementation, a wearable heads-up display includes a capability to authenticate a user by iris recognition. The wearable heads-up display having iris recognition capability as disclosed herein is one that is capable of capturing an image of at least one eye of a subject user while the subject user is wearing the wearable heads-up display. In one implementation, the user may be authenticated by the wearable heads-up display to allow access to protected resources on the wearable heads-up display. In one example, authentication of the subject user on the wearable heads-up display may be performed in response to a request to unlock the wearable heads-up display. In one example, the subject user may use an interface device, voice, eye gaze, gestures, and the like to indicate to the wearable heads-up display a desire to unlock the wearable heads-up display. In another example, the request to unlock the wearable heads-up display may be inferred based on contextual situation. For example, the wearable heads-up display while locked may detect, e.g., through a proximity sensor, that the wearable heads-up display is on the head of a subject user, and the wearable heads-up display may interpret this state as a request to unlock the wearable heads-up display.

In general, the wearable heads-up display may be considered to be locked when the user does not have access to protected resources on the wearable heads-up display and unlocked otherwise. In at least one implementation, the wearable heads-up display includes a feature where if the wearable heads-up display is not worn on the head of the user, the wearable heads-up display immediately becomes locked. In one example, a proximity sensor on the wearable heads-up display detects proximity of the wearable heads-up display to a point or area on the head of the user while the wearable heads-up display is on. If the proximity output of the proximity sensor is below a proximity threshold, the wearable heads-up display may infer that the wearable heads-up display is not on the head of the user, or at least not in a position on the head of the user where display content projected by the wearable heads-up display will be viewable by the user, and automatically switch to the locked mode. This may offer a truly secure device where the risk of forgetting to lock the device or a third party manipulating the user into unlocking the device is muted, since the device can only be unlocked while the registered user is wearing the device.

In another implementation, the user may be authenticated by the wearable heads-up display to allow access to protected resources on a secondary interactive system, such as a digital or interactive kiosk, e.g., interactive ATM, automated passport control, and the like. In one example, authentication of the user on the secondary interactive system may be performed in response to a request on the wearable heads-up display to access the secondary interactive system. For example, the subject user may select the secondary interactive system through a user interface in a display space provided by the wearable heads-up display, and this selection may trigger a request to authenticate the user on the secondary interactive system. Authenticating the user on the secondary interactive system may include authenticating the user on the wearable heads-up display and then transmitting corresponding authentication credentials from the wearable heads-up display to the secondary interactive system, e.g., over a secure wireless communication channel. The secondary interactive system may use the authentication credentials to validate the identity of the user and provide access to protected resources. In this case, the wearable heads-up display eliminates the need for the secondary interactive system to be responsible for capturing biometric samples from the user.

FIG. 1A illustrates a wearable heads-up display 100 that is capable of capturing an image of an eye according to one implementation. Wearable heads-up display 100 has an appearance of eyeglasses. In general, the wearable heads-up display contemplated in this disclosure may take on any form that is worn on the head of a user and that enables the user to view display content without preventing the user from viewing the environment. Such wearable heads-up displays may also be referred to as near-eye displays. It is possible to use the method and system of authentication described in this disclosure with head-mounted displays that present display content to the user while blocking the view of the environment from the user. Therefore, the method and system of authentication described in this disclosure are not limited to wearable heads-up displays that enable viewing of both display content and the environment by a user.

In one example, wearable heads-up display 100 includes a support frame 102 that carries the devices, electronics, and software that enable wearable heads-up display 100 to display content to a user in a display space. In one example, support frame 102 includes a frame front 104 carrying a pair of transparent lenses 106a, 106b and temples 103a, 103b attached to opposite sides of frame front 104. Many of the components of wearable heads-up display 100 are carried by or within temples 103a, 103b. Frame front 104 may include structures, such as conductors, to enable communication between components carried by or within temples 103a, 103b. Frame front 104 may also carry components of wearable heads-up display 100, such as proximity sensor 134.

In one implementation, wearable heads-up display 100 includes a scanning laser projector 113 carried by support frame 102, e.g., by temple 103a of support frame 102. Scanning laser projector 113 includes a laser module 114 that is operable to generate infrared light and visible light. Laser module 114 may have any number and combination of light sources to generate infrared light and visible light. In one example, laser module 114 may include an infrared laser diode (not shown separately) to generate infrared light. In other examples, other types of infrared light sources, such as infrared vertical-cavity, surface-emitting laser (VCSEL), light emitting diode (LED), and micro-LED, may be used. Laser module 114 may further include a plurality of visible laser diodes, or other visible light sources, (not shown separately) to generate visible light in different wavebands. As a further example, the visible laser diodes may include a red laser diode to generate red light, a green laser diode to generate green light, and a blue laser diode to generate blue light. Laser module 114 may include optics to combine the output beams of the multiple laser diodes into a single combined beam 115.

Scanning laser projector 113 further includes an optical scanner 118 that is positioned, oriented, and operable to receive laser beam 115 from laser module 114 and scan the laser beam 115 across eye 110, or at least a portion of eye 100. In one implementation, optical scanner 118 includes at least one scan mirror. In one example, optical scanner 118 may be a two-dimensional scan mirror operable to scan in two directions, for example, by oscillating or rotating with respect to two axes. In another example, scan mirror 118 may include two orthogonally-oriented mono-axis mirrors, each of which oscillates or rotates about its respective axis. The mirror(s) of optical scanner 118 may be microelectromechanical systems (MEMS) mirrors, piezoelectric mirrors, and the like. In operation, optical scanner or scan mirror(s) 118 scans laser beam 115 over eye 110 by sweeping through a range of scan orientations. For each scan orientation, scan mirror(s) 118 receives laser beam 115 from laser module 114 and reflects laser beam 115 into a respective region of eye 110. In other implementations, optical scanner 118 may be a mirrorless optical scanner, such as a fiber optic scanner, or a combination of mirror and mirrorless optical scanning elements.

Figure 1B:
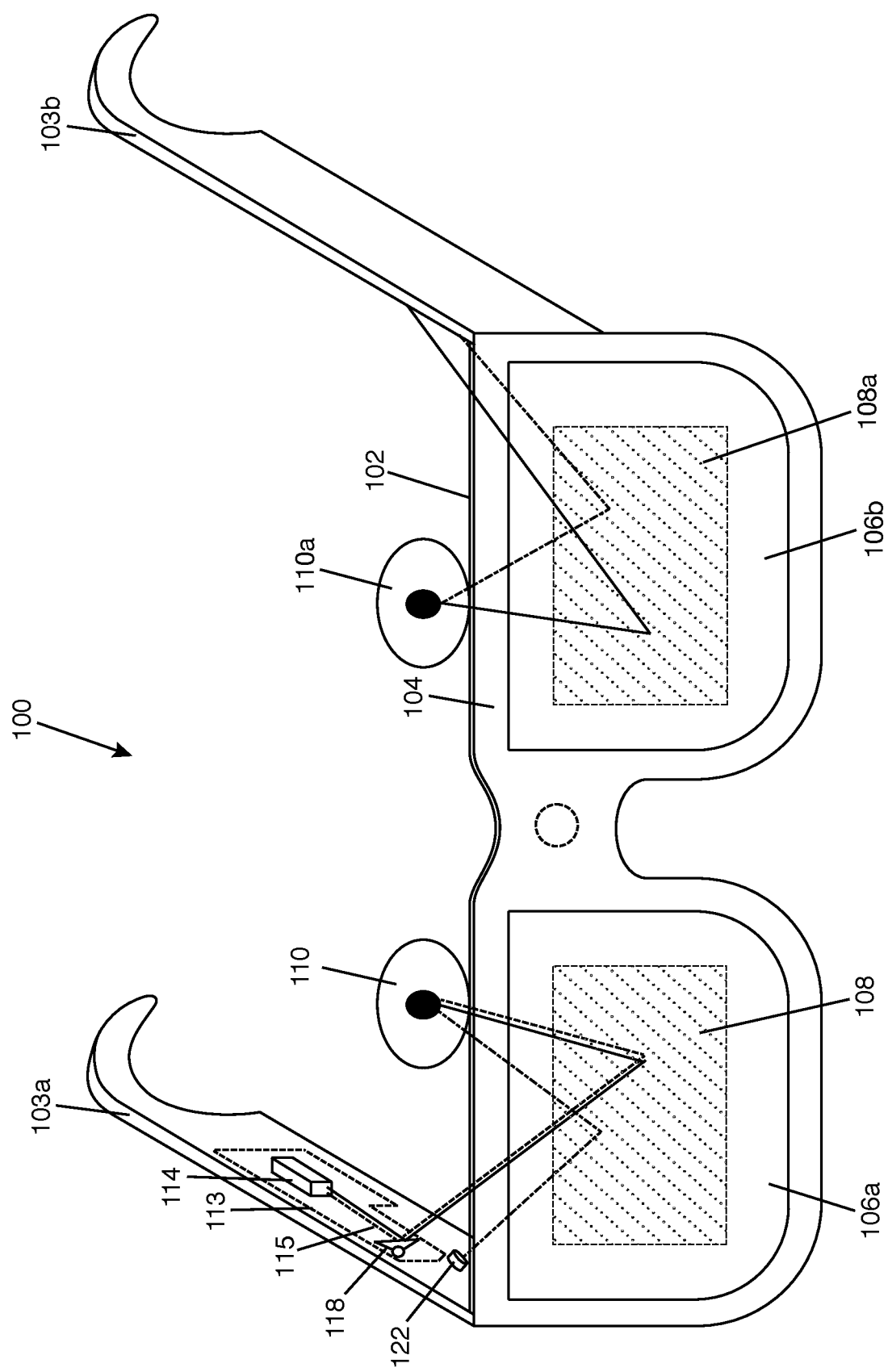
FIG. 1B is a perspective view of a wearable heads-up display and illustrates scanning of both eyes of a user.

In one implementation, optical scanner 118 scans at least a portion, or even an entirety of, a visible portion of eye 110 by directing laser beam 115 to lens 106a in a field of view of the wearable heads-up display. Lens 106a may be a combiner lens including a transparent combiner 108 that redirects the laser beam 115 to eye 110. In another implementation, as illustrated in FIG. 1B, lens 106b may also be a combiner lens including a transparent combiner 108a (similar to transparent combiner 108) that redirects a laser beam to eye 110a. Temple 103b may carry a laser module (similar to laser module 114) that generates the laser beam and an optical scanner (similar to optical scanner 115) that reflects the laser beam to transparent combiner 108a. The setup shown in FIG. 1B would allow scanning of both eyes of the user.

Figure 1C:
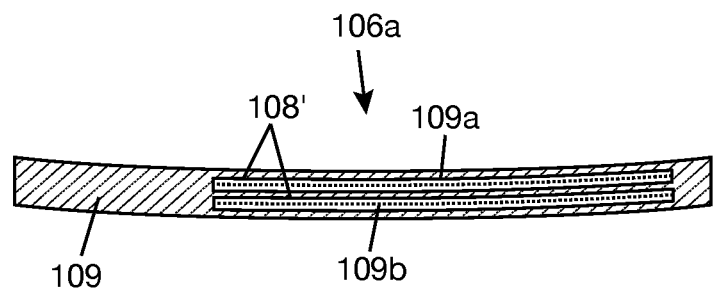
FIG. 1C is a cross-sectional view of a combiner lens including infrared and visible holograms.

In one example, transparent combiner 108 (in FIG. 1A) may be a free-space combiner implemented with a wavelength-multiplexed holographic optical element that selectively responds to different wavelengths of light. In general, a holographic optical element is an optical element that is produced using holographic principles and processes. In one implementation, as illustrated in FIG. 1C, transparent combiner 108' may include at least one visible hologram 109a that is responsive to infrared light and unresponsive to visible light and at least one infrared hologram 109b that is responsive to visible light and unresponsive to infrared light. "Responsive," herein, means that the hologram redirects at least a portion of the light, where the magnitude of the portion depends on the playback efficiency of the hologram. "Unresponsive," herein, means that the hologram transmits the light, generally without modifying the light. The holograms 109a, 109b are encoded, carried, embedded in or on, or otherwise generally included in a single volume of holographic material, e.g., photopolymer and/or a silver halide compound. Holograms 109a, 109b may be embedded in or otherwise attached to lens 109. Holograms 109a, 109b and lens 109 will provide combiner lens 106a (in FIG. 1A).

Figure 1D:
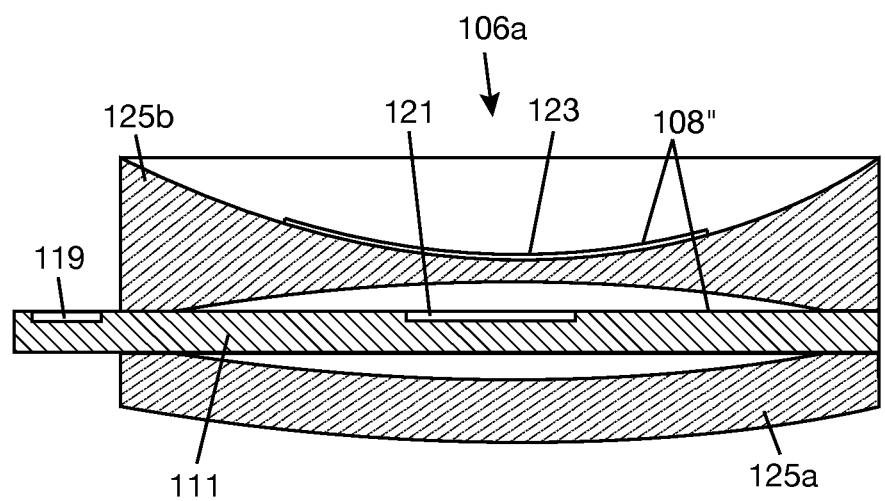
FIG. 1D is a cross-sectional view of a combiner lens including a lightguide and an infrared hologram or hot mirror.

In another implementation, transparent combiner 108 (in FIG. 1A) may be a substrate-guided combiner. As illustrated in FIG. 1D, transparent combiner 108" may include a waveguide or lightguide 111, hereafter referred to as lightguide 111, carrying in-coupler 119 for coupling light into the lightguide and an out-coupler 121 for coupling light out of the lightguide. Lightguide 111 transfers collimated light by total internal reflection. In addition, transparent combiner 108" may include an infrared hologram or hot mirror 123 that is responsive to infrared light and unresponsive to visible light. The infrared hologram or hot mirror 123 may be used to direct infrared light to the eye, while lightguide 111 and associated couplers 119, 121 may be used to transfer visible light to the eye. Alternatively, lightguide 111 and couplers 119, 121 may transfer both visible light and infrared light to the eye, i.e., transparent combiner 108" may not include infrared hologram or hot mirror. In the example shown in FIG. 1D, lightguide 111 is positioned between lenses 125a, 125b. Lens 125b is the eye side lens, and lens 125a is the world side lens. The entire assembly shown in FIG. 1D may be used as lens 106a in FIG. 1A.

Returning to FIG. 1A, wearable heads-up display 100 includes an infrared detector 122 to detect reflections of infrared light from eye 110. In general, an infrared detector is a device that is sensitive to and responsive to infrared light and that provides signals responsive to sensing or detecting infrared light. In one example, infrared detector 122 is a single photodiode sensor or photodetector that is responsive to infrared light. In another example, infrared detector 122 may be a plurality of photodetectors that are responsive to infrared light. Wearable heads-up display 100 may include one or a plurality of infrared detectors 122. Infrared detector 122 is positioned to detect reflections of infrared light from eye 110, e.g., by detecting reflections of infrared light directly from eye 110 and/or directly from transparent combiner 108, which is positioned to receive reflections of infrared light from eye 110. Infrared detector 122 is carried by support frame 102 of wearable heads-up display, e.g., by temple 103a of support frame 102 as shown or by frame front 104 in other implementations. In the implementation of wearable heads-up display 100 shown in FIG. 1B, support frame 102 may carry another infrared detector (not shown, but similar to infrared detector 122 in FIG. 1A) in a position to detect reflections of infrared light from eye 110a.

Returning to FIG. 1A, wearable heads-up display 100 includes a computer system. For illustrative purposes, the computer system is shown at 125 in temple 103b. However, components of computer system 125 may generally be within any of temples 103a, 103b, and frame front 104. In addition, frame front 104 may include communication structures, such as conductors, to enable communication between components carried in temples 103a, 103b. In the illustrated example shown in FIG. 1E, computer system 125 includes an applications processor 126, display engine 128, communications circuitry 130, storage 132, power management 133, and battery 135. In other examples, computer system 125 may have additional components not shown in FIG. 1E and may be configured differently than shown in FIG. 1E.

Applications processor 126 is a chip that runs the operating system and applications software of the wearable heads-up display. Applications processor 126 may include a processor 124, GPU 136, and memory 138. Processor 124 and GPU 136 may be communicatively coupled to memory 138. Memory 138 may be a temporary storage to hold data and instructions that can be accessed quickly by processor 124 and GPU 136. Storage 132 may be a more permanent storage to hold data and instructions. Each of memory 138 and storage 132 may be a non-transitory computer-readable storage medium that stores data and instructions and may include one or more of random-access memory (RAM), read-only memory (ROM), Flash memory, solid state drive, or other computer-readable storage medium. Processor 124 may be a general-purpose computer that performs computational operations. For example, processor 124 may be a central processing unit (CPU), a microprocessor, a controller, an application specific integrated circuit (ASIC), system on chip (SOC) or a field-programmable gate array (FPGA).

Figure 1E:
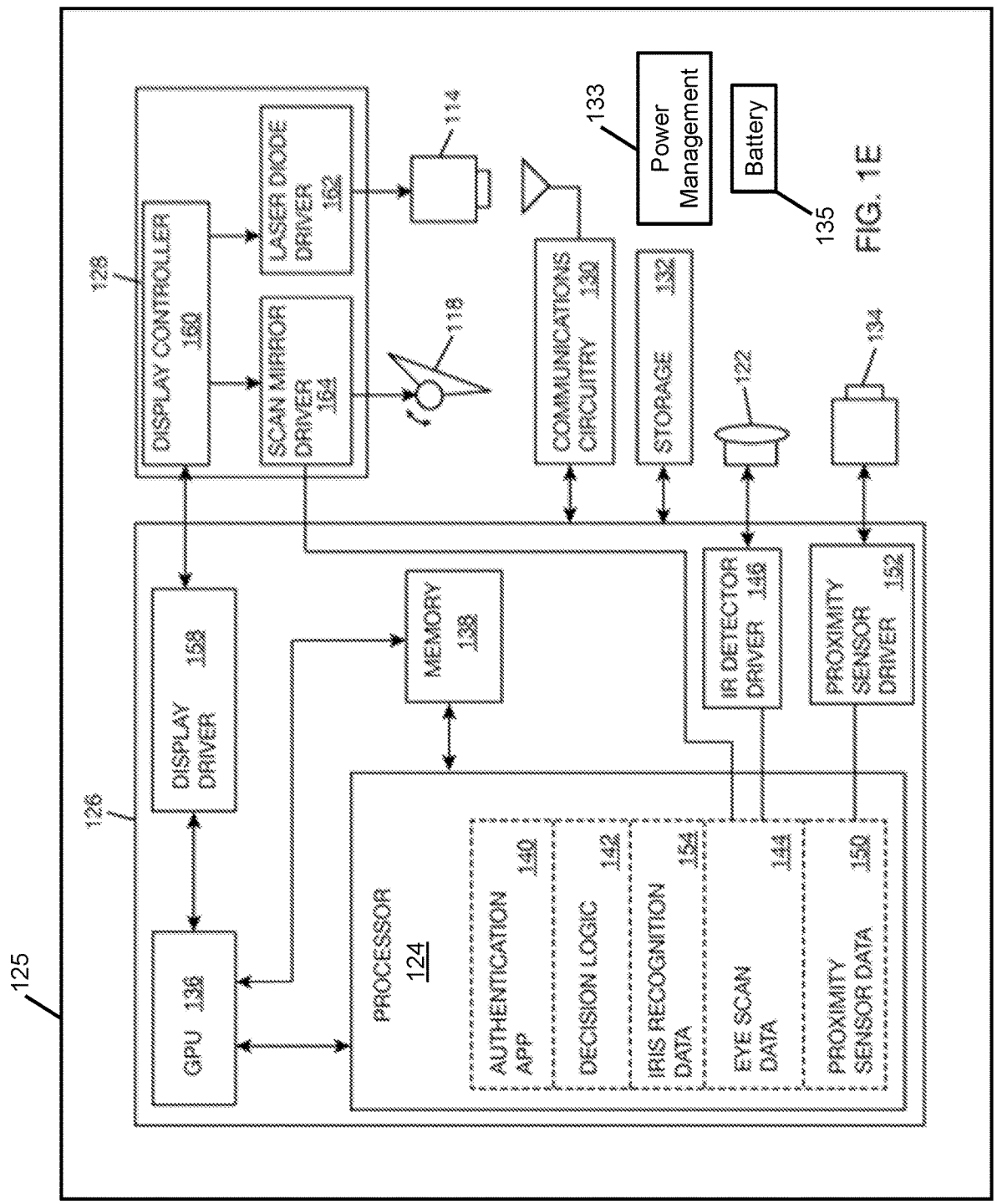
FIG. 1E is a block diagram showing components of an electronics module.

In the example of FIG. 1E, processor 124 is illustrated as executing instructions of an authentication application ("authentication app") 140. Authentication app 140 includes decision logic 142, which when executed by processor 124 authenticates a user on the wearable heads-up display. Various examples of decision logic 142 are illustrated in FIGS. 2, 3A-3C, 4, and 5. Authentication app 140 may receive eye scan data 144, from which images of an eye, or of a portion of an eye, can be constructed. In one example, eye scan data 144 includes reflections of infrared light detected from the eye by infrared detector 122 and scan orientations of optical scanner 118 corresponding to the detected reflections. If both eyes are scanned with infrared light, each eye may have its own associated infrared detector. In this case, eye scan data 144 may include reflections of infrared light detected from both eyes by the respective infrared detector and scan orientations of the respective optical scanner corresponding to the detected reflections. Applications processor 126 may include an infrared (IR) detector driver 146 to enable authentication app 140 to receive samples of the output signal of infrared detector 122. Authentication app 140 may receive sync mirror signals, which control scan orientation of optical scanner 118, from scan mirror driver 164. Alternatively, authentication app 140 may receive images of the eye from another application or circuitry that takes the eye scan data 144 and constructs the images of the eye from the eye scan data. Authentication app 140 may receive proximity sensor data 150 from proximity sensor 134. Proximity sensor data 150 may be used in decision logic 142, e.g., to determine if the wearable heads-up display is on the head of the user or not. Applications processor 126 may include a proximity sensor driver 152 to enable authentication app 140 to receive proximity sensor data 150. Authentication app 140 may receive iris recognition data 154 from an external iris recognition system. Communications circuitry 130 may provide the connectivity over which the iris recognition data 154 is received. Communications circuitry 130 may enable Wi-Fi connectivity, Bluetooth connectivity, and/or other connectivity based on known wireless network standards.

In the applications processor 126, GPU 136 may receive display data from processor 124 and write the display data into a frame buffer, which may be transmitted, through display driver 158, to display controller 160 of display engine 128. Display controller 160 may provide the display data to laser diode driver 162 and sync controls to scan mirror driver 164. Laser diode driver 162 modulates the infrared and visible laser diodes in the laser module 114 according to the display data. Scan mirror driver 164 applies driving voltages to the scan mirror(s) of the optical scanner 118 so that the laser beam provided by the laser module lands on the correct spot in the display space. For the purpose of capturing an image of the eye, the "display data" may have an infrared component that will not be visible to the eye. Although one laser module 114 and one optical scanner 118 are shown in FIG. 1E for scanning one eye of the user, there may be an additional laser module and additional optical scanner (not shown) for scanning the other eye of the user. The additional laser module and optical scanner may be controlled as described above for the laser module 114 and optical scanner 118.

Before a user can be authenticated on a wearable heads-up display, the user has to be enrolled as a registered user on the wearable heads-up display. The enrollment process may generally include capturing or constructing at least one image of at least a portion of an eye of a subject user. The enrollment process further includes extracting biometric identification data from the at least one image of at least a portion of an eye of the subject user ("reference biometric identification data"), and storing, or otherwise associating, the reference biometric identification data with the wearable heads-up display. In one example, the reference biometric identification data includes at least one iris image of the subject user ("reference iris image") isolated from the at least one image of at least one eye of the subject user and/or an iris template derived from the at least one reference iris image ("reference iris template"). An "iris template" is a digital representation of the unique features that have been extracted from an iris image. In some examples herein, the reference biometric identification data may further include one or more auxiliary eye features, such as eyelash pattern, eyelid shape, occlusion of the iris based on upper and/or lower eyelids ("eyelid occlusion pattern"), and pupillary iris boundary shape. This may enable a multi-factor authentication method based on iris pattern and at least one auxiliary eye feature.

During authentication, at least one image or representative structure of at least one eye, or portion(s) thereof, of a subject user wearing the wearable heads-up display is captured or constructed. The authentication process includes extracting biometric identification data from the at least one image or representative structure of at least one eye of the subject user ("test biometric identification data"). In one example, the test biometric identification data includes at least one iris image of the subject user ("test iris image") and/or an iris template derived from the at least one test iris image ("test iris template"). The authentication process includes determining a similarity measure between the test biometric identification data and the reference biometric identification data associated with the wearable heads-up display and making a decision based on the similarity measure. The similarity measure is the measure of how much alike two data objects are. The similarity measure may be expressed in terms of a value of similarity or in terms of a probability of similarity. The similarity measure may be determined between test and reference iris templates or between test and reference iris images. If the biometric identification data are enhanced to include one or more auxiliary eye features, similarity between auxiliary eye feature(s) of the test iris template and auxiliary eye feature(s) of the reference iris template may be considered as well in validating the identity of the user.

Figure 2:
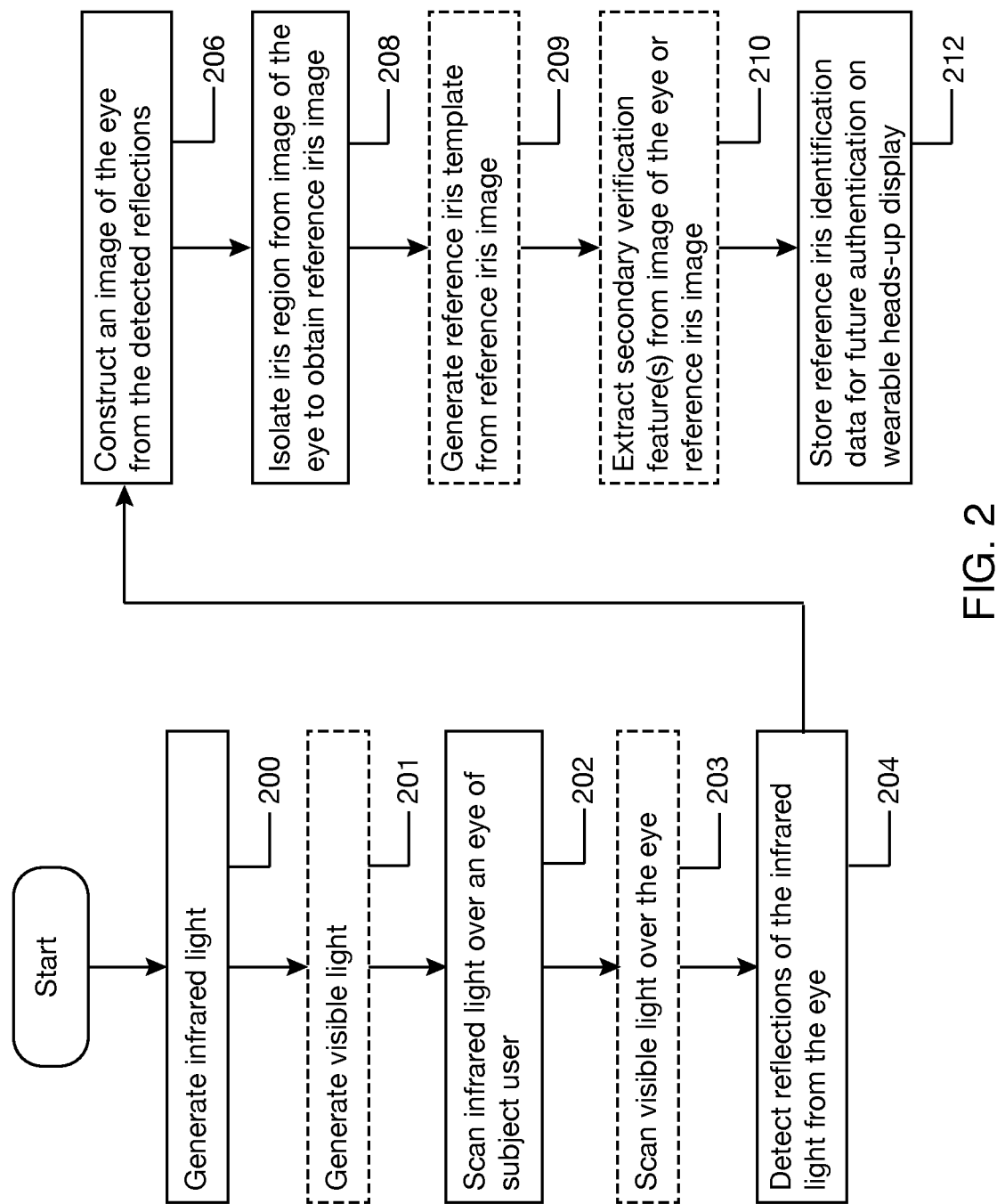
FIG. 2 is a flowchart illustrating a process of configuring a wearable heads-up display for user authentication, according to at least one illustrated implementation.

FIG. 2 illustrates a process of enrolling a user as a registered user on a wearable heads-up display. The process of FIG. 2 corresponds to one aspect of the decision logic 142 of the authentication app 140 in FIG. 1E. Acts 200 to 212 of the process are performed for one eye of the subject user. Acts 200 to 212 may be repeated for the other eye of the user, which would allow both eyes of the user to be involved in user authentication. At the start of the process, the subject user is wearing the wearable heads-up display. The wearable heads-up display may present a configuration user interface (UI) in the display space that informs the user that iris biometric information will be collected and stored for subsequent authentication of the user on the device. The user may have the option of accepting or rejecting collection of the iris biometric information. If the user agrees to collection of the iris biometric information, the wearable heads-up display starts the process of enrolling the user as an authorized user on the wearable heads-up display.

At 200, infrared light is generated by the laser module (114 in FIG. 1A) over a time period. In some implementations, the intensity of the infrared light may be varied over the time period. In some implementations, at 201, visible light may be generated by the laser module over the time period. Acts 200 and 201 may be simultaneously performed by the laser module. In some implementations, the intensity of the visible light may be varied over the time period.

At 202, the infrared light is scanned or swept over an eye of the subject user through a plurality of scan orientations of the optical scanner (118 in FIG. 1A). At 203, if visible light is generated at 201, the visible light may be scanned or swept over the eye. Acts 202 and 203 may be simultaneously performed by the same optical scanner. In one example, the intensity of the visible light may be selected to contract the pupil to allow as much detail of the iris of the eye as possible to be captured. In another example, different intensities of infrared light generated at 200 and/or different intensities of visible light generated at 201 may enable different images of the eye to be captured at different pupil sizes.

At 204, reflections of the infrared light from the eye are detected by the infrared detector (122 in FIG. 1A). At 206, the processor (e.g., 124 in FIG. 1E) constructs at least one image of the eye from at least a portion of the reflections of the infrared light detected by the infrared detector and corresponding scan orientations. In some implementations, the processor may construct a plurality of images of the eye from at least a portion of the reflections of the infrared light detected by the infrared detector, where each image may correspond to a different sweep of the eye with infrared light or a sweep of the eye with different infrared light intensity or a sweep of the eye with different visible light intensity.

With respect to constructing an image of the eye, each detected reflection comes from a point in a scan area including the eye. It is possible to imagine the scan area as being made of an array of pixels. For each scan orientation, the infrared light from the optical scanner strikes one of the pixels in the scan area and is reflected from the pixel. By determining the scan orientation corresponding to each detected reflection, the pixel location of the detected reflection in the scan area can be determined, and the image of the eye can be constructed from the detected reflections. The quality of the constructed image of the eye may be assessed. If the constructed image of the eye is not of high quality, e.g., if the image is blurry due to eye movement, or if the eye is obstructed by eyelids or eyelashes, acts 200 to 206 may be repeated to allow another image of the eye to be constructed from detected reflections and scan orientations.

At 208, the processor isolates an iris region of the image of the eye from the remaining parts of the eye to obtain a reference iris image. In some implementations, instead of the processor isolating the iris region of the image of the eye to obtain the reference iris image, the processor may delegate the process of isolating the iris region to an external iris recognition system, in which case the processor may transmit the image of the eye to the external iris recognition system and receive the corresponding reference iris image from the external iris recognition system. The processor may communicate with the external iris recognition system over a secure wireless communication channel established between the wearable heads-up display and the external iris recognition system. Where multiple images of the eye are constructed at 206, a reference iris image may be obtained by the processor or from the external iris recognition system for each image of the eye.

Optionally at 209, the processor may generate a reference iris template from the reference iris image. In some implementations, instead of the processor generating the reference iris template, the processor may send a request to an external iris recognition system to generate the reference iris template. This may include transmitting an image of the eye (from which a reference iris image can be obtained) or the reference iris image to the external recognition system and receiving a corresponding reference iris template from the external recognition system. Where multiple reference iris images are generated at 208, a reference iris template may be generated for each reference iris image, which would result in a set of reference iris templates for the registered user that may be used for authentication. Alternatively, a single reference iris template may be generated from multiple reference iris images (see, for example, Aly et al., "Enhancing iris recognition system performance using template fusion," Ain Shams Engineering Journal (2012) 3, 133-140).

There are various techniques for generating an iris template from an iris image in the art and any effective one of the techniques may be used to generate the reference iris template(s) in 209. In general, many of the techniques for generating an iris template in the art are based on the work of John G. Daugman, as described, for example, in U.S. Pat. No. 5,291,560 to Daugman. In one example, Daugman's work, or adaptations/variations thereof, is used to generate the reference iris template(s) in 209.

A procedure for generating an iris template generally includes iris segmentation, iris normalization, and feature encoding. Iris segmentation is a process by which the iris is located in the image of the eye. The process typically involves defining the pupillary iris boundary and the limbic iris boundary of the iris texture and isolating the iris region between these boundaries. Typical methods for iris segmentation include Daugman's integro-differential operator, circular Hough transform, and canny edge detection (see, for example, Poornima et al., "Comparison and a Neural Network Approach for Iris Localization," Procedia Computer Science 2 (2010) 127-132). A neural network can also be used for precise iris segmentation (see, Poornima et al., supra). Iris normalization typically involves transforming the iris image from a Cartesian coordinate system to a coordinate system that is less sensitive to unwanted variations in the iris image to allow comparisons between iris images. Iris normalization may be based on Daugman's rubber sheet model (see, for example, Daugman, supra). In some cases, iris normalization may be omitted from the iris template generation process and performed during authentication. Feature encoding involves extracting features from the iris image and encoding the features in the form of the iris template. Gabor filter, log-Gabo filter, zero-crossing of the wavelet transform, and the like may be used to extract iris features (see, for example, Aly et al., supra; Tiago et al., "Iris Verification System with Secure Template Storage," $18^{th}$ European Signal Processing Conference (EUSIPCO-2010), Aalborg, Denmark, Aug. 23-27, 2010).

Optionally at 210, at least one auxiliary eye feature may be extracted from each image of the eye constructed at 206 or each reference iris image isolated at 208. The auxiliary eye feature may be selected from eyelash pattern, eyelid shape, occlusion of the iris based on upper and/or lower eyelids ("eyelid occlusion pattern"), and pupillary iris boundary shape.

At 212, in one example, the processor stores the reference biometric identification data as data file(s) or data/objects in a database in a memory of wearable heads-up display, e.g., in storage 132 in FIG. 1E. The reference biometric identification data may include any combination of the reference iris image(s) isolated at 208, reference iris template(s) generated at 209, and auxiliary eye feature(s) extracted at 210. Prior to storage, the reference biometric identification data may be encrypted using an appropriate cryptographic algorithm. In another example, at 212, the reference biometric identification data, or a part thereof, may be stored in a secure or encrypted part of a memory that is external to the wearable heads-up display. This may allow the wearable heads-up display to delegate part of the user authentication process, such as matching of test biometric identification data to reference biometric identification data, to an external iris recognition system. If only one eye will be involved in authentication, i.e., monocular authentication, reference biometric identification data for the one eye may be stored in association with the wearable heads-up display. Alternatively, if both eyes will be involved in authentication, i.e., binocular authentication, reference biometric identification data for both eyes may be stored in association with the wearable heads-up display.

Figure 3A:
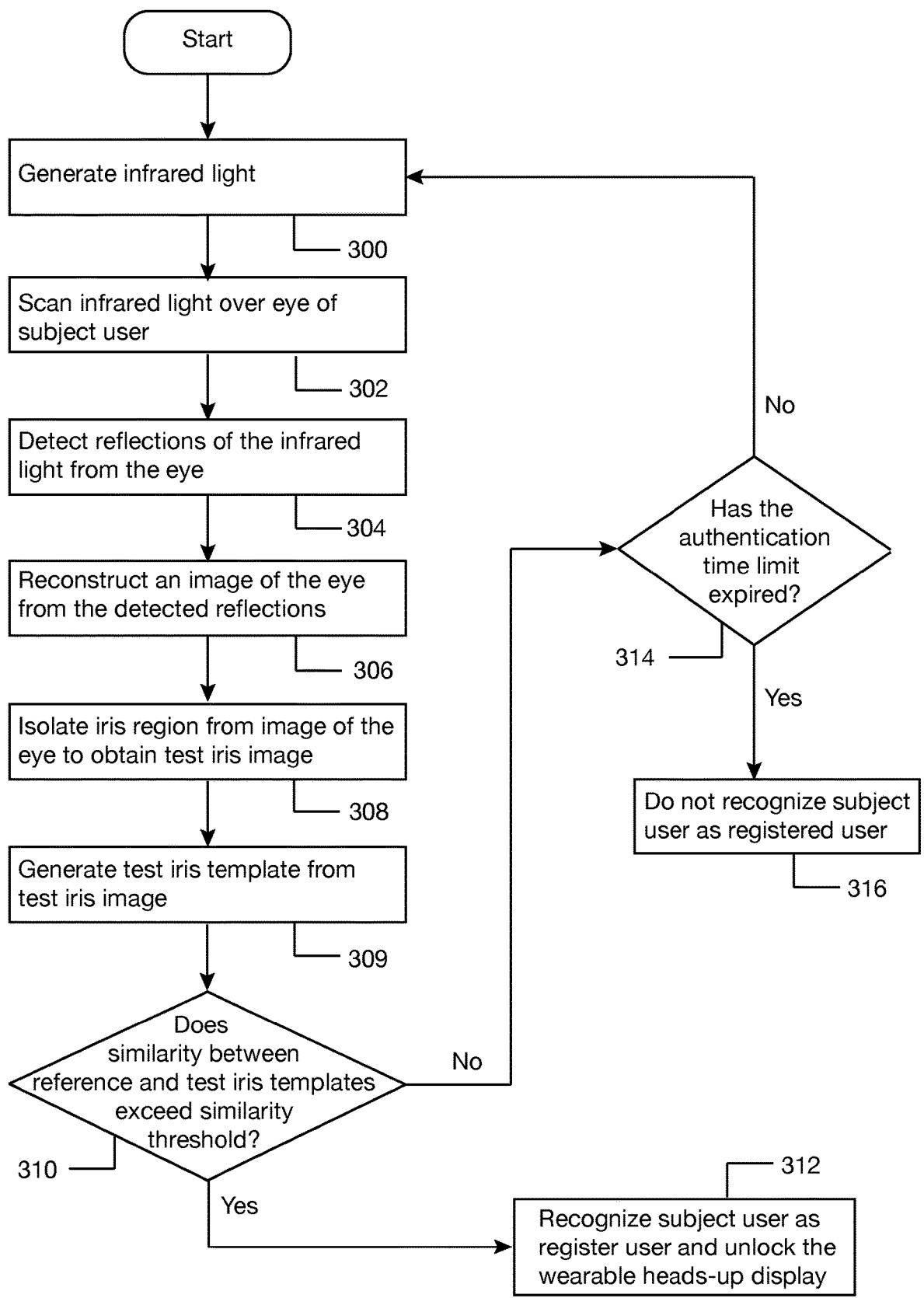
FIG. 3A is a flowchart illustrating a process of authenticating a user on a wearable heads-up display, according to one illustrated implementation.

FIG. 3A illustrates a process of authenticating a user on a wearable heads-up display that has been configured as described in FIG. 2. The process of FIG. 3A corresponds to another aspect of the decision logic 142 of the authentication app 140 in FIG. 1E. At the start of the process, the subject user, i.e., the user to be authenticated, is wearing the wearable heads-up display. In one contextual situation, the wearable heads-up display is on but locked. The user may request the wearable heads-up display to unlock itself, or a program running in the wearable heads-up display may detect that the wearable heads-up display is locked and generate a request to unlock the wearable heads-up display. For example, the program may monitor the output of proximity sensor 134 (in FIG. 1A) while the wearable heads-up display is on, and if the program detects that the output of proximity sensor 134 exceeds a proximity threshold, which indicates that the wearable heads-up display is on the head of the user, and that the wearable heads-up display is locked, the program may generate a request to unlock the wearable heads-up display. Upon the system receiving or inferring the request to unlock the wearable heads-up display, the authentication process may begin.

In one implementation, infrared light is generated by the laser module (114 in FIG. 1A) at 300. The infrared light is scanned over an eye of the subject user through a plurality of scan orientations of the optical scanner (118 in FIG. 1A) at 302—this should be the same eye location as in the configuration of the wearable heads-up display, e.g., if the right eye was scanned at 202 in FIG. 2A, then the right eye should be scanned at 302 in FIG. 3 (on the other hand, if both eyes were involved in the configuration of the wearable heads-up display, then infrared light may be scanned over both eyes of the user). At 304, reflections of the infrared light from the eye(s) are detected by the infrared detector (122 in FIG. 1A). At 306, the processor (e.g., 124 in FIG. 1E) constructs at least one image of the eye from the reflections of the infrared light detected by the infrared detector and scan orientations of the optical scanner. At 308, the processor may isolate an iris region of the at least one image of the eye from the remaining parts of the eye to obtain a test iris image, or the processor may request an external iris recognition system to isolate the iris region from the at least one image of the eye. At 309, the processor may generate a test iris template from the test iris image, or the processor may request an external iris recognition system to generate the test iris template from the test iris image. The iris recognition algorithm used in generating the test iris template in 309 should be the same as the iris recognition algorithm used in generating the reference iris template in 209 (in FIG. 2). If both eyes are involved in authentication, acts 300 to 309 would be performed for each of the eyes to obtain a test iris template for each eye. This will lead to two test iris images at 308, one for each eye, and two test iris templates at 309, one for each eye.

In one implementation, at 310, the test iris template is compared to the reference iris template stored in, or associated with, the wearable heads-up display. The processor may make the comparison or delegate the comparison to an external iris recognition system. Delegating comparison of the iris templates to the external iris recognition system may include transmitting the test iris template, or at least a portion thereof, to the external iris recognition system. There are various techniques for comparing iris templates. One technique is based on calculating the Hamming distance between the iris templates. This is described, for example, in the aforementioned U.S. Pat. No. 5,291,560 to Daugman. Another technique is based on calculating the Euclidean distance between the iris templates (see, Aly et al., supra, p. 135). An example of a commercial iris recognition system is FPC ACTIVEIRIS®. If the similarity between the test iris template and the reference iris template exceeds a similarity threshold, then the user may be deemed to be an authorized user of the wearable heads-up display.

If both eyes are involved in authentication, the similarity comparison at 310 may be between a set of test iris templates corresponding to both eyes of the user and a set of reference iris templates corresponding to a reference pair of eyes stored in, or associated with, the wearable heads-up display. In this case, the user may be deemed to be an authorized user of the wearable heads-up display if the similarity between the test iris template for the left eye and the reference iris template for the left eye exceeds the similarity threshold for the left eye and if the similarity between the test iris template for the right eye and the reference iris template for the right eye exceeds the similarity threshold for the right eye, i.e., a similarity comparison is performed for each eye. Alternatively, a combined (or binocular) test iris template may be generated from the set of test iris templates (or from the set of test iris images obtained at 308), a combined (or binocular) reference iris template may be generated from the set of reference iris templates, and the similarity comparison may be between the binocular test iris template and the binocular reference iris template.

The similarity threshold may be determined during manufacture of the wearable heads-up display and stored in, or associated with, the wearable heads-up display. In one example, the similarity threshold may be determined by collecting multiple iris identification data from each of multiple training users, computing a similarity between randomly paired iris identification data from the multiple training users, determining which similarity values correspond to paired iris identification data that belong to the same training user, and establishing a similarity threshold based on the similarity values. If both eyes are involved in authentication, the process described above may be performed for each eye to obtain a similarity threshold for each eye. Alternatively, a combined (or binocular) similarity threshold may be established for both eyes—this may involve collecting multiple iris identification data for both eyes from each of multiple training users, combining the iris identification data for both eyes for each of the training users, computing a similarity between randomly paired combined iris identification data from the multiple training users, determining which similarity values correspond to paired combined iris identification data that belong to the same training user, and establishing a binocular similarity threshold based on the similarity values—the binocular similarity threshold obtained will be valid for a combination of both eyes.

When the wearable heads-up display is configured for only one user, one or more similarity thresholds associated with the wearable heads-up display may be periodically updated with iris identification data collected during authentication of the user on the wearable heads-up display. For example, if a registered user of the wearable heads-up display tends to exceed a similarity threshold associated with the wearable heads-up display for the left eye by a wide margin, it may be that the similarity threshold is not high enough for the left eye that user. In this case, the similarity threshold associated with the wearable heads-up display for the left eye may be increased. In general, a similarity threshold to authenticate one eye or a binocular similarity threshold to authenticate both eyes or a set of similarity thresholds to authenticate both eyes may be associated with the wearable heads-up display. Any of the similarity thresholds associated with the wearable heads-up display may be updated as described above.

At 312, if the similarity between the test iris template and the reference iris template exceeds the similarity threshold, the authentication is deemed to be successful. For binocular authentication, the similarity comparison may be between a set of test iris templates and a set of reference iris templates. Authentication in this case is deemed to be successful if the similarity between the test iris template and the reference iris template for the left eye exceeds the similarity threshold for the left eye and if similarity between the test iris template and the reference iris template for the right eye exceeds the similarity threshold for the right eye. Alternatively, for binocular authentication, authentication may be deemed to be successful if the similarity between a combined test iris template and a combined reference iris template for both eyes exceed the binocular similarity threshold. If authentication is successful, the processor recognizes the subject user as a registered user and unlocks the wearable heads-up display.

If the similarity between the test iris template and the reference iris template does not exceed the similarity threshold, the authentication is deemed to be unsuccessful. Or, in the case of binocular authentication, if the similarity between the test iris template and the reference iris template for each eye does not exceed the respective similarity threshold or if the similarity between a binocular test iris template and a binocular reference iris template for both eyes does not exceed the binocular similarity threshold, the authentication is deemed to be unsuccessful. The processor may determine if the authentication time limit has expired, as shown at 314. For example, the authentication process may have a time limit within which the user should be successfully authenticated in order to carry out another action, such as unlocking the wearable heads-up display. If the authentication time limit has not expired, acts 300 to 310 may be repeated. Instead of checking if the authentication time limit has expired at 314, the processor may instead check if a number of allowed authentication attempts has been exceeded. Acts 300 to 310 may be repeated until the user is successfully authenticated or until the authentication time limit expires (or until a number of allowed authentication attempts has been exceeded), whichever is earlier. At 316, if the authentication time limit has expired (or if a number of allowed authentication attempts has been exceeded) and the user was not successfully authenticated, the processor does not recognize the subject user as a registered user and does not carry out a further privileged action such as unlocking the wearable heads-up display. The processor may cause a message to be displayed to the user to the effect that the user is not a registered user on the wearable heads-up display.

Figure 3B:
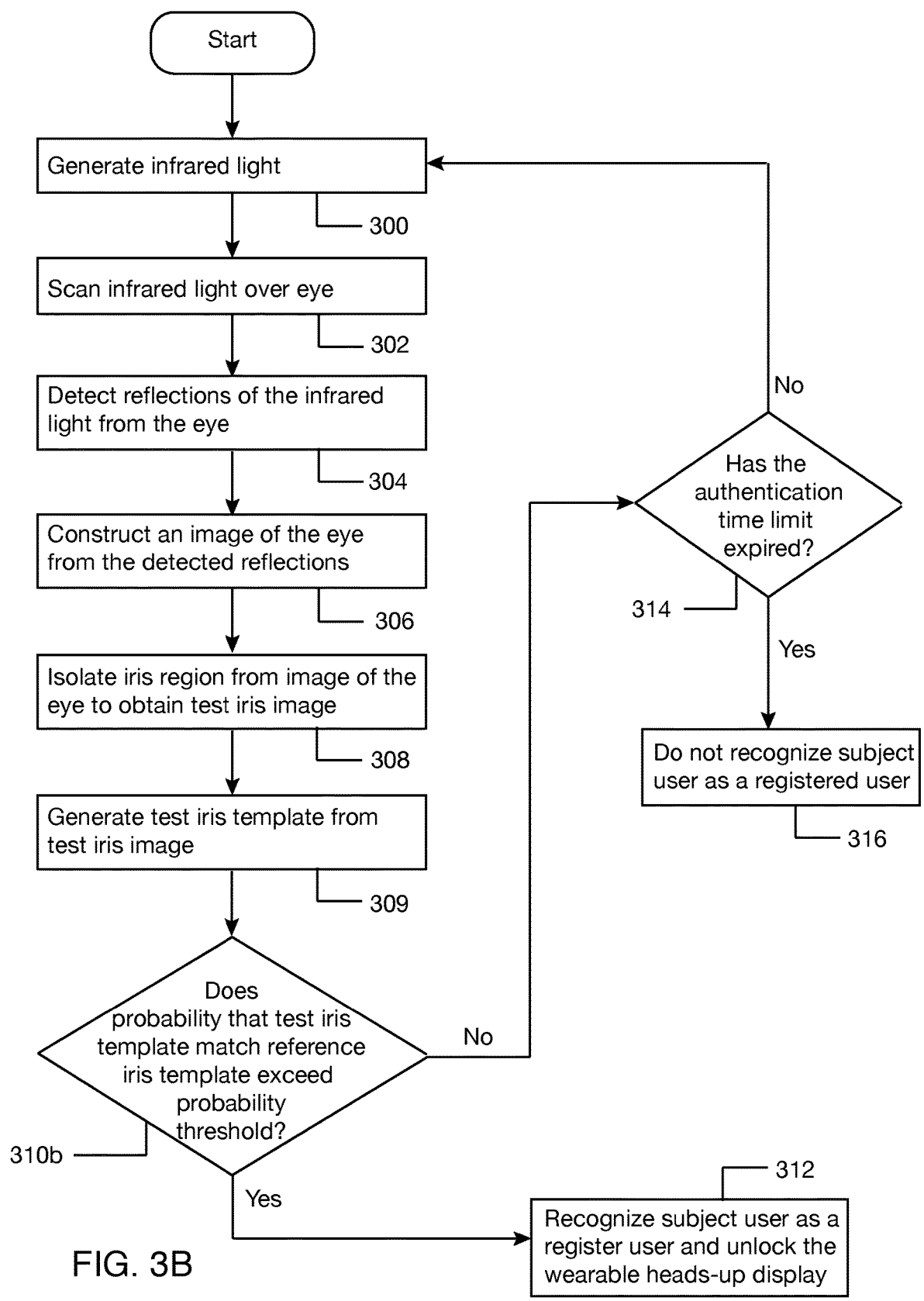
FIG. 3B is a flowchart illustrating another process of authenticating a user on a wearable heads-up display, according to another implementation.

FIG. 3B illustrates a process of authenticating a user on a wearable heads-up display (100 in FIG. 1A) that has been configured as described in FIG. 2 according to another implementation. Acts 300-309 of FIG. 3B are the same as acts 300-309 of FIG. 3A. At 310b, a neural network may be used to obtain a probability that the test iris template is the same as the reference iris template. It should be noted that the probability is a measure of similarity between the iris templates. The neural network will give a probability together with a confidence level of the probability. If the probability that the test iris template is the same as the reference iris template exceeds a probability threshold with an acceptable confidence metric, the test iris template can be deemed to be the same as the reference iris template, and the subject user can be recognized as the registered user as shown at 312. If the probability that the test iris template is the same as the reference iris template does not exceed the probability threshold, the remainder of the process can continue as shown at 314 and previously explained with reference to FIG. 3A. The process illustrated in FIG. 3B may be used for binocular authentication as well. In this case, at 310b, the neural network will obtain a probability that a set of test iris templates corresponding to both eyes is the same as a set of reference iris templates associated with the wearable heads-up display.

Figure 3C:
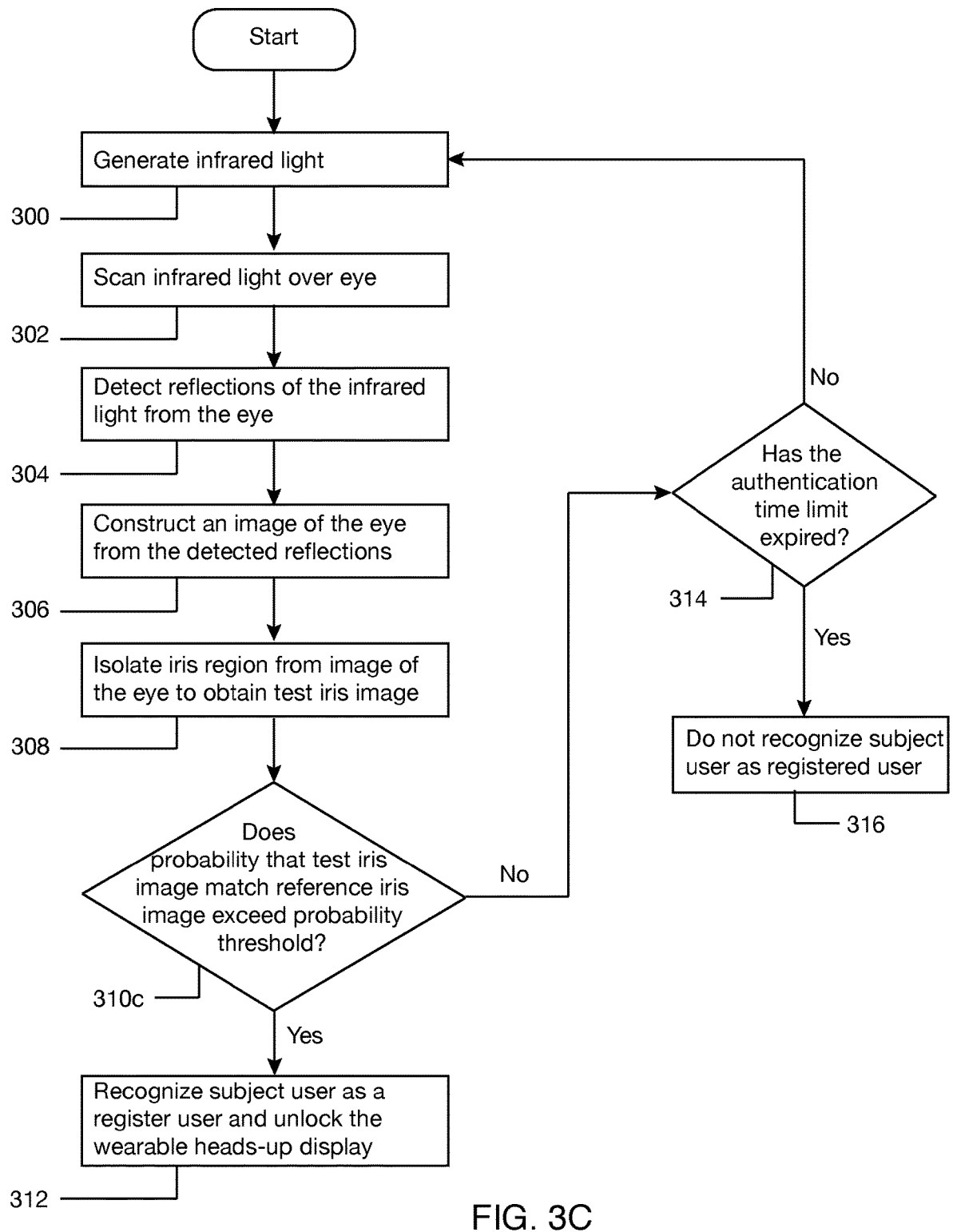
FIG. 3C is a flowchart illustrating another process of authenticating a user on a wearable heads-up display, according to another implementation.

FIG. 3C illustrates a process of authenticating a user on a wearable heads-up display (100 in FIG. 1A) that has been configured as described in FIG. 2 according to another implementation. Acts 300-308 of FIG. 3C are the same as acts 300-308 of FIGS. 3A and 3B. The process of FIG. 3C does not include generating an iris template (e.g., 309 of FIG. 3B). Instead, at 310c, a neural network may be used to obtain a probability that the test iris image is the same as the reference iris image. The neural network will give a probability together with a confidence level of the probability. If the probability that the test iris image is the same as the reference iris image exceeds a probability threshold with an acceptable confidence metric, the test iris image can be deemed to be the same as the reference iris image, and the subject user can be recognized as the registered user as shown at 312. If the probability that the test iris image is the same as the reference iris image does not exceed the probability threshold, the remainder of the process can continue as shown at 314 and previously explained with reference to FIG. 3A. The process illustrated in FIG. 3B may be used for binocular authentication as well. In this case, at 310c, the neural network will obtain a probability together with a confidence level that a set of test iris images corresponding to both eyes is the same as a set of reference iris images associated with the wearable heads-up display.

Authentication may involve matching a test iris image (or a test iris template) obtained from one eye to a reference iris image (or reference iris template) obtained from one eye. Where the registered user has a set of reference iris images (or a set of reference iris templates) obtained from one eye, authentication may involve finding a match between the test iris image (or test iris template) and at least one of the set of reference iris images (or set of reference iris templates). Alternatively, where the registered user has a set of reference iris images (or set of reference iris templates) obtained from both eyes, authentication may involve finding a match between a set of test iris images (or set of test iris templates) and a set of reference iris images (or set of reference iris templates). Also, in some implementations, matching iris images or iris templates may involve not only determining whether the test and reference iris patterns are similar enough but also determining whether auxiliary eye features, such as eyelash pattern or eyelid shape or occlusion pattern on the iris, are similar enough.

The authentication process may be expanded to incorporate security measures such as fake eye detection. It is possible to imagine a situation where someone may be able to create a 3D model of an eye that includes a fake pupil and an iris that matches a registered user's iris on the wearable heads-up display. It would be useful to be able to distinguish when an eye presented to the wearable heads-up display for authentication is not a real eye. In one implementation, infrared light of variable intensity or visible light of variable intensity is scanned over the eye to detect if the pupil contracts or dilates in response to the varying light. If the pupil does not contract or dilate, the processor may determine that the eye is a fake eye. The fake eye detection may be performed before validating the identity of the user based on iris identification data.

Figure 4:
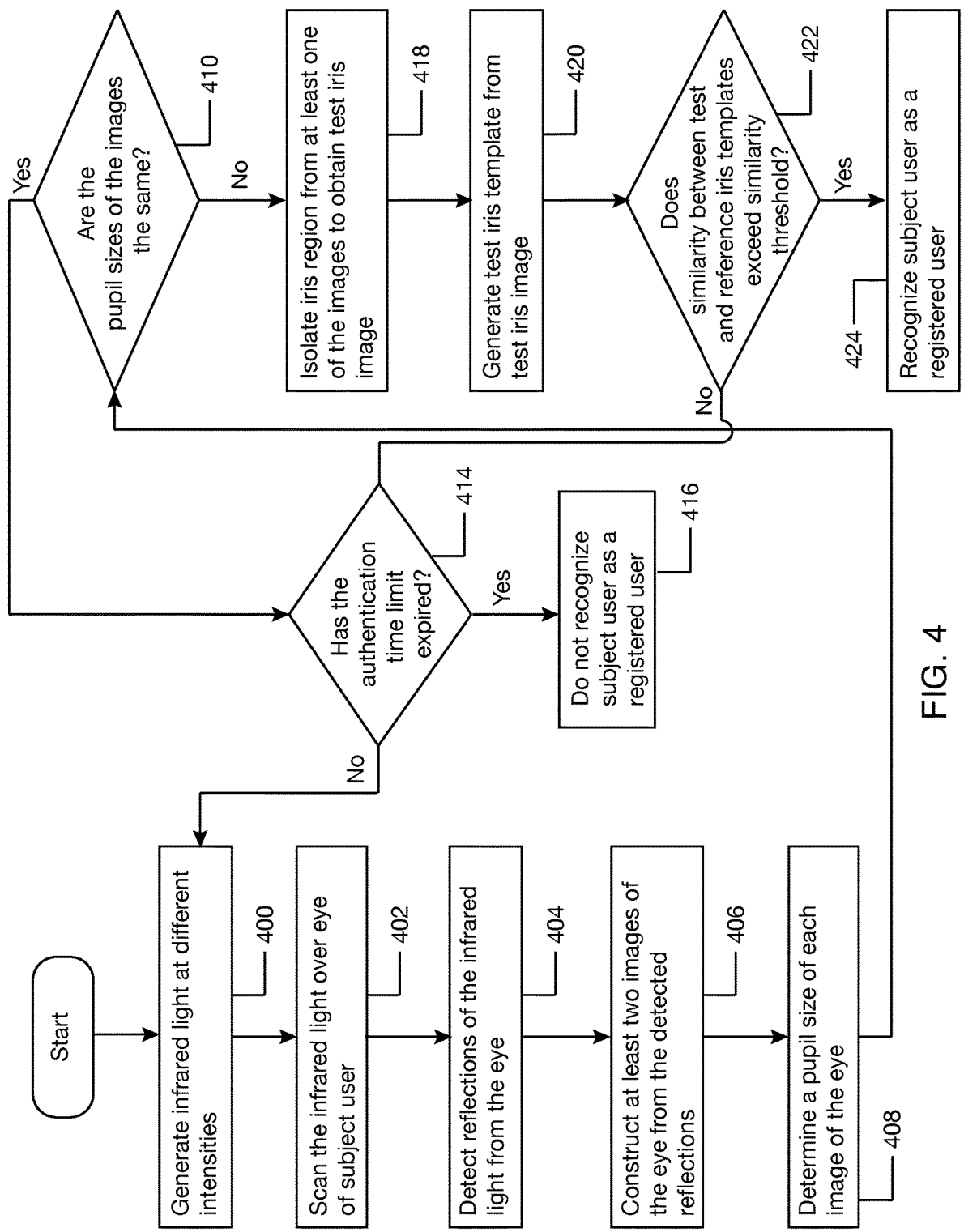
FIG. 4 is a flowchart illustrating a process for detecting a fake eye, according to one illustrated implementation.

FIG. 4 shows a process for incorporating fake eye detection into user authentication on a wearable heads-up display. The process of FIG. 4 corresponds to another aspect of the decision logic 142 of the authentication app 140 in FIG. 1E. At 400, infrared light is generated at different intensities. At 402, the infrared light is scanned over the eye through a plurality of scan orientations. At 404, the reflections of the infrared light from the eye are detected. At 406, at least two images of the eye are constructed from the detected reflections and scan orientations, each image should correspond to a different infrared light intensity. At 408, the processor detects a pupil from each image and determines a size, e.g., diameter of the pupil. At 410, the processor determines if the pupil sizes of the two images are the same. If the pupil sizes are the same, it may be concluded that the eye scanned at 402 is a fake eye. At 414, the processor may determine if the authentication time limit has not expired. If not, the processor may repeat 400 to 410 to be certain that there were no irregularities in capturing the images of the eye and that the eye is really fake. If the authentication time limit has expired and the eye appears to be fake, the user is not recognized as a registered user, as shown at 416.

At 410, if the pupil sizes are not the same, the eye may be assumed to be a real eye, and the process may proceed with validating the identity of the subject user. At 418, the processor may select one of the images constructed at 406 for authentication. The processor may isolate iris region from the selected image to obtain a test iris image. At 420, the processor may generate a test iris template from the test iris image (or request an external iris recognition system to generate the test iris template). At 422, the processor determines whether a value of a similarity measure between the test iris template and the reference iris template exceeds the similarity threshold. At 424, if the similarity value exceeds the similarity threshold, the user is recognized as a registered user, and further action such as unlocking the wearable heads-up display may be taken. Otherwise, if at 422 the value of the similarity measure between the test iris template and the reference iris template does not exceed the similarity threshold, the processor may repeat the authentication process if the authentication time limit has not expired.

FIG. 4 is illustrated as using the authentication process in FIG. 3A if the eye is not fake. However, the authentication process illustrated in FIG. 3B or 3C may be used in other examples. In other implementations, visible light may be used to detect whether the eye is fake or not. That is, at 400, same intensity infrared light and variable intensity visible light may be generated and scanned over the eye. If the eye is not fake, the pupil should contract or dilate in response to the different intensities of the visible light.

The instructions for the processes described in FIG. 2, FIGS. 3A-3C, and FIG. 4 may be stored in a memory of the wearable heads-up display (e.g., 132 in FIG. 1E) and executed by a processor of the wearable heads-up display (e.g., 124 in FIG. 1E). The iris recognition algorithm used in generating the iris templates may also be stored in a memory of the wearable heads-up display and executed by the processor of the wearable heads-up display. Alternatively, the authentication app may delegate part or all of generation of the iris templates to an external iris recognition system that can be communicatively coupled to the wearable heads-up display. An example of a commercial iris recognition system is FPC ACTIVEIRIS®. The communication between the external iris recognition system and the wearable heads-up display may be established during configuration of the wearable heads-up display and during user authentication on the wearable heads-up display. The communication between the external iris recognition system and the wearable heads-up display may be established over an encrypted communication channel. The authentication app may also delegate determination of a similarity measure between iris images and/or iris templates to an external iris recognition system.

Figure 5:
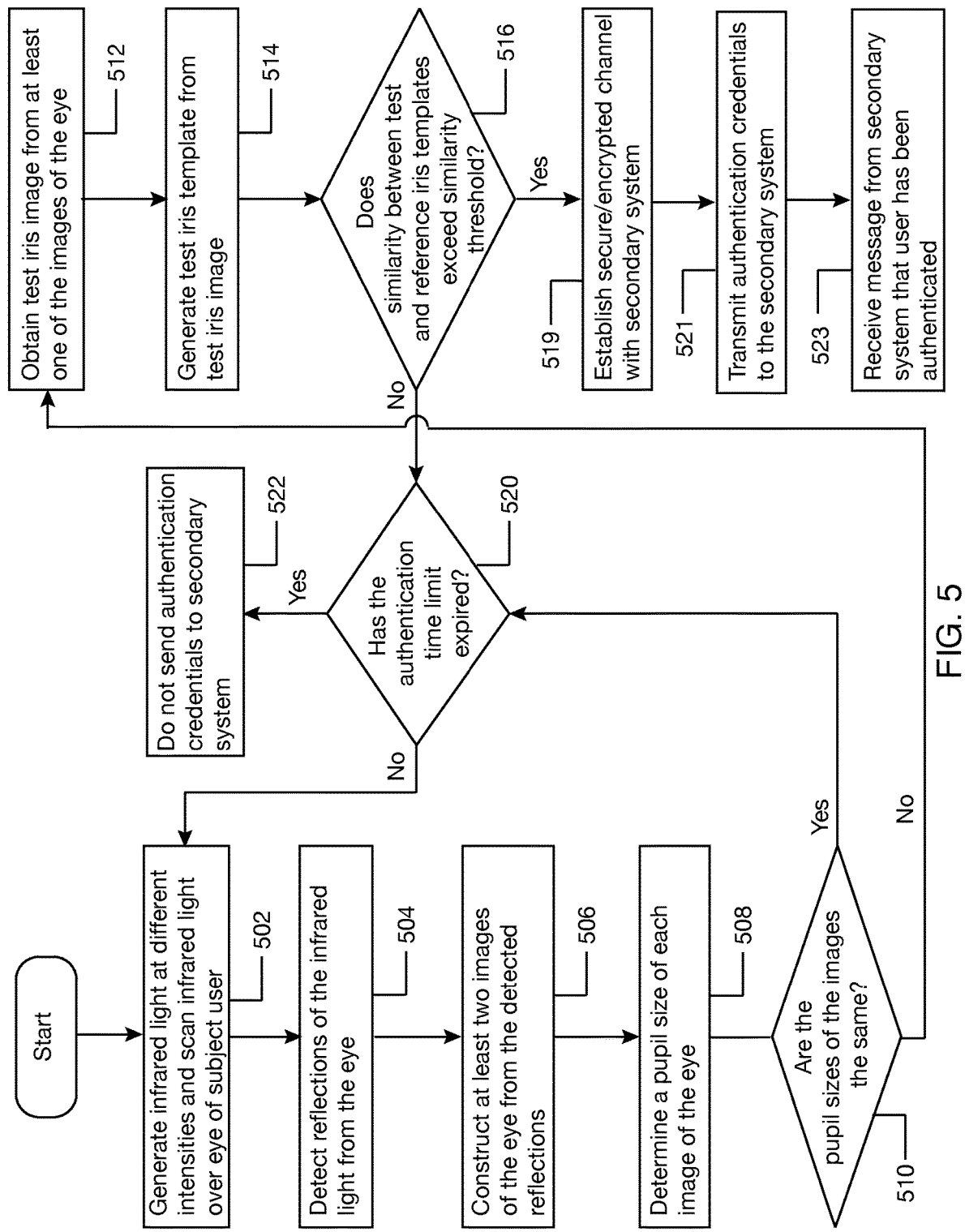
FIG. 5 is a flowchart illustrating a process of authenticating a user on a secondary interactive system through a wearable heads-up display.

FIG. 5 illustrates a process of authenticating a user on a secondary interactive system using a wearable heads-up display configured as described in FIG. 2. The process of FIG. 5 corresponds to another aspect of the decision logic 142 of the authentication app 140 in FIG. 1E. The secondary interactive system may be, for example, a digital or interactive kiosk or another smart device that requires user authentication. At the beginning of the process, the user is wearing the wearable heads-up display. The user may request access to the secondary interactive system, or the wearable heads-up display may detect that the user wishes to access the secondary interactive system. In one implementation, at 502, infrared light is generated at different intensities and the infrared light is scanned over an eye of the user wearing the wearable heads-up display through a plurality of scan orientations. At 504, reflections of infrared light from the eye are detected. At 506, at least two images of the eye are constructed from the detected reflections and scan orientations. At 508, a pupil size of each image is determined. At 510, the processor determines if the pupil sizes of the images are the same. If they are not the same, the processor, at 512, obtains a test iris image from at least one of the images of the eye. At 514, the processor generates a test iris template from the test iris image. At 516, the processor determines whether a value of a similarity between the test iris template and the test iris image exceeds the similarity threshold. If the similarity value exceeds the similarity threshold, the user is recognized as a registered user.

At 519, if the subject user is recognized as a registered user, a secure/encrypted communication channel is established between the wearable heads-up display and the secondary interactive system. The secure/encrypted communication channel may be a wireless communication channel. At 521, the wearable heads-up display transmits authentication credentials to the secondary interactive system over the secure/encrypted channel. The authentication credentials may include at least a portion of the reference biometric identification data, or at least a portion of the test biometric identification data, associated with the user. The secondary interactive system may use the authentication credentials to validate the identity of the user and begin an interactive session with the user. At 523, the wearable heads-up display may receive a message from the secondary interactive system that the user has been authenticated. Unless the wearable heads-up display is used for further interaction with the secondary interactive system, the secure/encrypted communication channel between the wearable heads-up display and the secondary interactive system may be closed.

If the subject user is not successfully authenticated on the wearable heads-up display at 516, the processor may determine if the authentication time limit has expired (or if an allowable number of authentication attempts has been exceeded) at 520. If the authentication time limit has not expired (or if an allowable number of authentication attempts has not been exceeded), the process may return to 502 to allow another stab at authentication of the user. If the subject user is not successfully authenticated at 516 and the authentication time limit has expired (or an allowable number of authentication attempts has been exceeded) at 520, then at 522, the wearable heads-up display does not transmit authentication credentials to the secondary interactive system. The wearable heads-up display may notify the user that the user is not a registered user and cannot access the secondary interactive system through the wearable heads-up display.

At 510, if the pupil sizes of the images are the same, the wearable heads-up display will presume that the eye scanned at 502 is a fake eye. The processor may repeat capturing of images of the eye to double-check that the eye is fake if the authentication time limit has not expired. Thus, FIG. 5 incorporates fake eye detection into authenticating a user on a secondary interactive system. If fake eye detection is not desired, then the acts related to generating varying intensities of light to change the pupil size and detecting whether the pupil sizes of at least two images are the same may be omitted.

The foregoing detailed description has set forth various implementations or embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "non-transitory processor-readable medium" or "non-transitory computer-readable memory" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples of the processor-readable medium are a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory medium.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A method of operating a wearable heads-up display that in use is worn on a head of a subject user, the wearable heads-up display having associated therewith reference biometric identification data of at least one registered user, the method comprising:
   generating an infrared light;
   scanning the infrared light over at least a portion of at least one eye of the subject user through a plurality of scan orientations of an optical scanner;
   detecting reflections of infrared light from the at least one eye of the subject user during the scanning of the at least one eye;
   determining, for each detected reflection, a scan orientation of the optical scanner associated with the detected reflection;
   constructing at least one image or representative structure associated with the at least one eye of the subject user based on the detected reflections and each determined scan orientation;
   extracting test biometric identification data from the at least one image or representative structure;
   determining a similarity measure between the test biometric identification data and the reference biometric identification data; and
   authenticating the subject user based on the similarity measure.

2. The method of claim 1, further comprising receiving a request to unlock the wearable heads-up display, wherein extracting test biometric identification data from the at least image or representative structure is in response to the request.

3. The method of claim 2, further comprising detecting a proximity of the wearable heads-up display to a head of the subject user and triggering the request to unlock the wearable heads-up display in response to the proximity of the wearable heads-up display to the head of the subject user exceeding a proximity threshold.

4. The method of claim 2, wherein authenticating the subject user based on the similarity measure comprises:
   determining whether a value of the similarity measure exceeds a similarity threshold or a probability threshold, and
   unlocking the wearable heads-up display in response to a determination that the value of the similarity measure exceeds the similarity threshold or the probability threshold.

5. The method of claim 1, further comprising, upon a successful authentication of the subject user, transmitting a set of authentication credentials including at least a portion of the reference biometric identification data or the test biometric identification data to a secondary interactive system for a confirmatory authentication of the subject user on the secondary interactive system.

6. The method of claim 5, further comprising establishing a secure communication channel between the wearable heads-up display and the secondary interactive system, wherein the set of authentication credentials are transmitted to the secondary interactive system over the secure communication channel.

7. The method of claim 1, wherein extracting test biometric identification data from the at least one image or representative structure comprises isolating an iris region of the at least one image or representative structure to obtain a test iris image for the subject user.

8. The method of claim 7, wherein determining a similarity measure between the test biometric identification data and the reference biometric identification data comprises determining the similarity measure between the test iris image and a reference iris image included in the reference biometric identification data.

9. The method of claim 7, wherein extracting test biometric identification data from the at least one image or representative structure further comprises generating a test iris template from the test iris image, and wherein determining a similarity measure between the test biometric identification data and the reference biometric identification data comprises determining the similarity measure between the test iris template and a reference iris template included in the reference biometric identification data.

10. The method of claim 7, further comprising extracting a test auxiliary eye feature from the at least one image or representative structure, the test auxiliary eye feature including at least one of eyelash pattern, eyelid shape, and iris occlusion pattern, and wherein determining a similarity measure between the test biometric identification data and the reference identification data comprises determining the similarity measure between the test auxiliary eye feature and a reference auxiliary eye feature included in the reference biometric identification data.

11. The method of claim 1, wherein determining a similarity measure between the test biometric identification data and reference biometric identification data comprises receiving at least a portion of the reference biometric identification data from a non-transitory processor-readable storage medium associated with the wearable heads-up display.

12. The method of claim 1, wherein determining a similarity measure between the test biometric identification data and the reference biometric identification data comprises transmitting the test biometric identification data to an iris recognition system external to the wearable heads-up display.

13. The method of claim 12, wherein determining a similarity measure between the test biometric identification data and the reference biometric identification data further comprises transmitting at least a portion of the reference biometric identification data to the iris recognition system.

14. The method of claim 1, wherein scanning the infrared light over at least a portion of at least one eye of the subject user through a plurality of scan orientations comprises scanning the infrared light over at least a portion of each of the eyes of the subject user through a plurality of scan orientations,
wherein detecting reflections of infrared light from the at least one eye of the subject user comprises detecting reflections of infrared light from each of the eyes of the subject user during the scanning of the infrared light over at least the portion of each of the eye, and
wherein extracting test biometric identification data from the at least one image or representative structure comprises isolating an iris region of each of the at least one image or representative structure to obtain a set of test iris images for the subject user.

15. The method of claim 14, wherein determining a similarity measure between the test biometric identification data and the reference biometric identification data comprises determining the similarity measure between the set of test iris images and a set of reference iris images included in the reference biometric identification data.

16. The method of claim 14, wherein extracting test biometric identification data from the at least one image or representative structure further comprises generating a set of test iris templates from the set of test iris images, and wherein determining a similarity measure between the test biometric identification data and the reference biometric identification data comprises determining the similarity measure between the set of test iris templates and a set of reference iris templates included in the reference biometric identification data.

17. The method of claim 1, further comprising:
determining that the similarity measure exceeds a similarity threshold by a threshold amount; and
responsive to the similarity measure exceeding the similarity threshold by the threshold amount, adjusting the similarity measure.

18. A method of configuring a wearable heads-up display for authentication of a subject user, comprising:
generating an infrared light;
scanning the infrared light over at least a portion of at least one eye of the subject user through a plurality of scan orientations of an optical scanner;
detecting reflections of infrared light from the at least one eye of the subject user during the scanning of the at least one eye;
determining, for each detected reflection, a scan orientation of the optical scanner associated with the detected reflection;
constructing at least one image or representative structure associated with the at least one eye of the subject user based on the detected reflections and each determined scan orientation;
extracting biometric identification data from the at least one image or representative structure; and
storing at least a portion of the extracted biometric identification data in a non-transitory processor-readable memory associated with the wearable heads-up display.

19. The method of claim 18, wherein extracting biometric identification data from the at least one image or representative structure comprises isolating an iris region of the at least one image or representative structure.

20. The method of claim 19, wherein extracting biometric identification data from the at least one image or representative structure further comprises creating an iris template from the isolated iris region, and wherein storing at least a portion of the extracted biometric identification data in a non-transitory processor-readable memory associated with the wearable heads-up display comprises storing the iris template in the non-transitory processor-readable memory associated with the wearable heads-up display.

21. The method of claim 18, wherein scanning the infrared light over at least a portion of at least one eye of the subject user through a plurality of scan orientations comprises scanning the infrared light over at least a portion of each of the eyes of the subject user through a plurality of scan orientations,
    wherein detecting reflections of infrared light from the at least one eye of the subject user comprises detecting reflections of infrared light from each of the eyes of the subject user during the scanning of the infrared light over at least the portion of each of the eyes, and
    wherein extracting biometric identification data from the at least one image or representative structure comprises isolating an iris region of each of the at least one image or representative structure.

22. The method of claim 21, wherein extracting biometric identification data from the at least one image or representative structure further comprises creating an iris template from each of the isolated iris regions to obtain a set of iris templates, and
    wherein storing at least a portion of the extracted biometric identification data in a non-transitory processor-readable memory associated with the wearable heads-up display comprises storing the set of iris templates in the non-transitory processor-readable memory associated with the wearable heads-up display.

23. The method of claim 18, further comprising generating a visible light and scanning the visible light over at least a portion of the eye of the subject user, wherein scanning the visible light over at least a portion of the eye of the subject user is simultaneous with scanning the infrared light over at least a portion of the eye.

24. The method of claim 23, wherein generating the visible light comprises varying an intensity of the visible light over a period of time to alter a size of a pupil of the eye.

25. The method of claim 18, wherein generating an infrared light comprises varying an intensity of the infrared light over a period of time to alter a size of a pupil of the eye.

26. A method of operating a wearable heads-up display that in use is worn on a head of a subject user, the wearable heads-up display having associated therewith reference biometric identification data of at least one registered user, the method comprising:
    scanning, with an optical scanner, infrared light over at least a portion of at least one eye of the subject user;
    detecting reflections of the infrared light from at least the portion of the at least one eye of the subject user;
    determining, for each detected reflection, a scan orientation of the optical scanner associated with the detected reflection;
    constructing at least one image or representative structure of at least the portion of the at least one eye of the subject user based on the detected reflections and each determined scan orientation;
    extracting test biometric identification data from the at least one image or representative structure;
    determining a similarity measure between the test biometric identification data and the reference biometric identification data; and
    authenticating the subject user based on the similarity measure.

27. A wearable heads-up display having a field of view, the wearable heads-up display comprising:
    a support frame that in use is worn on a head of a subject user;
    a laser module carried by the support frame, the laser module to generate at least an infrared light;
    an optical scanner carried by the support frame, the optical scanner positioned and oriented to scan the infrared light over at least a portion of an eye of the subject user through a plurality of scan orientations;
    a combiner lens carried by the support frame, the combiner lens comprising a transparent combiner positioned within the field of view, the transparent combiner to receive the infrared light from the optical scanner and redirect the infrared light to the eye of the subject user;
    an infrared detector carried by the support frame, the infrared detector positioned and oriented to detect reflections of infrared light from the at least a portion of the eye of the subject user for the plurality of scan orientations;
    a processor carried by the support frame; and
    a non-transitory processor-readable storage medium communicatively coupled to the processor, wherein the non-transitory processor-readable storage medium stores reference biometric identification data associated with at least one registered user, wherein the non-transitory processor-readable storage medium further stores data and/or processor-executable instructions that, when executed by the processor, cause the wearable heads-up display to:
        extract, by the processor, test biometric identification data from at least a portion of reflections detected by the infrared detector and corresponding scan orientations of the optical scanner, each of the corresponding scan orientations indicating one of the plurality of scan orientations of the optical scanner associated with the one or more of the reflections detected by the infrared detector;
        determine a similarity measure between the test biometric identification data and the reference biometric identification data by the processor;
        authenticate the user based on the similarity measure by the processor;
        determine that the subject user requested access to a secondary interactive system; and
        responsive to the subject user being authenticated and having requested access to the secondary interactive system, transmit a set of authentication credentials including at least a portion of the reference biometric identification data or the test biometric identification data to the secondary interactive system.

\* \* \* \* \*